(12) United States Patent
Miller

(10) Patent No.: US 6,320,358 B2
(45) Date of Patent: Nov. 20, 2001

(54) BIDIRECTIONAL ENERGY MANAGEMENT SYSTEM INDEPENDENT OF VOLTAGE AND POLARITY

(75) Inventor: Peter John Miller, Shefford (GB)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/741,988

(22) Filed: Dec. 20, 2000

(30) Foreign Application Priority Data

Dec. 20, 1999 (GB) .................................................. 9929895

(51) Int. Cl.⁷ ...................................................... G05F 1/613
(52) U.S. Cl. .................... 323/222; 323/224; 323/225; 323/271; 307/10.1; 307/46; 307/65; 307/66; 307/75
(58) Field of Search .................................... 307/9.1, 10.1, 307/10.7, 43, 46, 48, 64, 65, 66, 75, 80, 85, 86, 87; 320/103, 105, 135, 165; 323/222, 223, 224, 225, 268, 271, 282, 299, 351

(56) References Cited

U.S. PATENT DOCUMENTS

| | | | |
|---|---|---|---|
| 3,105,910 | * | 10/1963 | Chambers ................................ 307/49 |
| 4,161,023 | * | 7/1979 | Goffeau .................................. 323/282 |
| 4,736,151 | * | 4/1988 | Dishner .................................. 323/224 |
| 4,801,859 | * | 1/1989 | Dishner .................................. 323/222 |
| 5,194,799 | * | 3/1993 | Tomantschger ......................... 320/48 |
| 5,488,283 | | 1/1996 | Dougherty et al. ..................... 320/15 |
| 5,633,577 | | 5/1997 | Matsumae et al. ..................... 322/37 |
| 5,852,332 | * | 12/1998 | Shearer .................................. 307/43 |
| 5,896,022 | * | 4/1999 | Jacobs .................................... 320/103 |
| 6,125,272 | * | 4/2001 | Ohara et al. ........................... 320/103 |
| 6,181,100 | * | 1/2001 | Shoji ...................................... 320/103 |
| 6,232,743 | * | 5/2001 | Nakanishi .............................. 320/103 |

FOREIGN PATENT DOCUMENTS

| 2 268 342 | 6/1992 | (GB) | ................................. H02J/7/14 |
|---|---|---|---|
| 2 342 515 | 10/1999 | (GB) | ................................. H02J/7/14 |

* cited by examiner

Primary Examiner—Jeffrey Sterrett

(57) ABSTRACT

An energy management system for a motor vehicle has a first voltage supply terminal having a first nominal voltage and a second voltage supply terminal having a second nominal voltage. At least one of the first and second voltage supply terminals has a battery. A universal bi-directional DC-DC converter is coupled to exchange energy between the first and second voltage supply terminals. A third voltage supply terminal is provided for exchanging energy between the DC-DC converter and an external vehicle electrical system or battery charger. The energy exchanged between the first or second voltage supply terminals and the third voltage supply terminal is independent of the voltage and polarity of the external vehicle electrical system or battery charger.

20 Claims, 1 Drawing Sheet

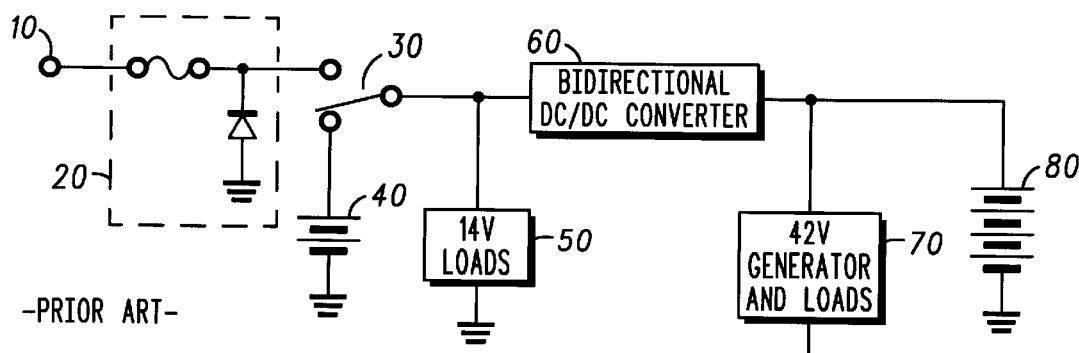
*FIG. 1* — PRIOR ART —
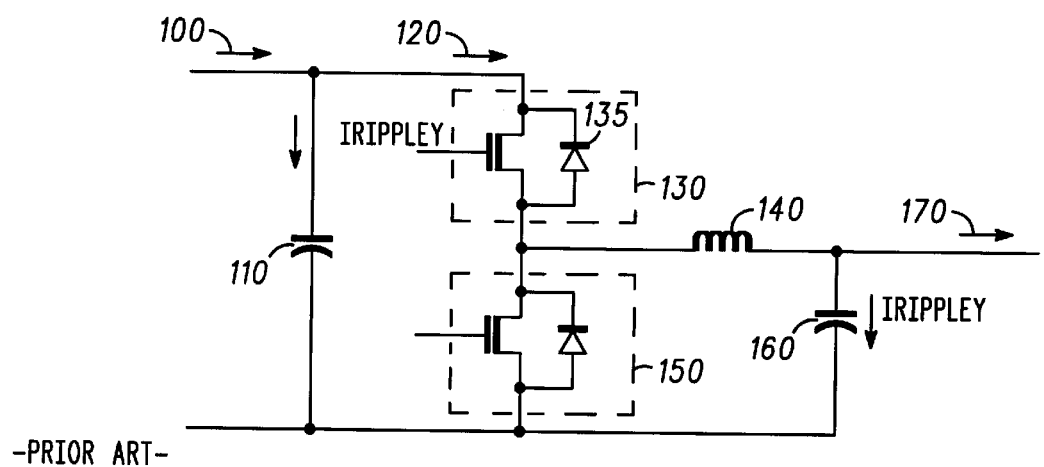
*FIG. 2* — PRIOR ART —
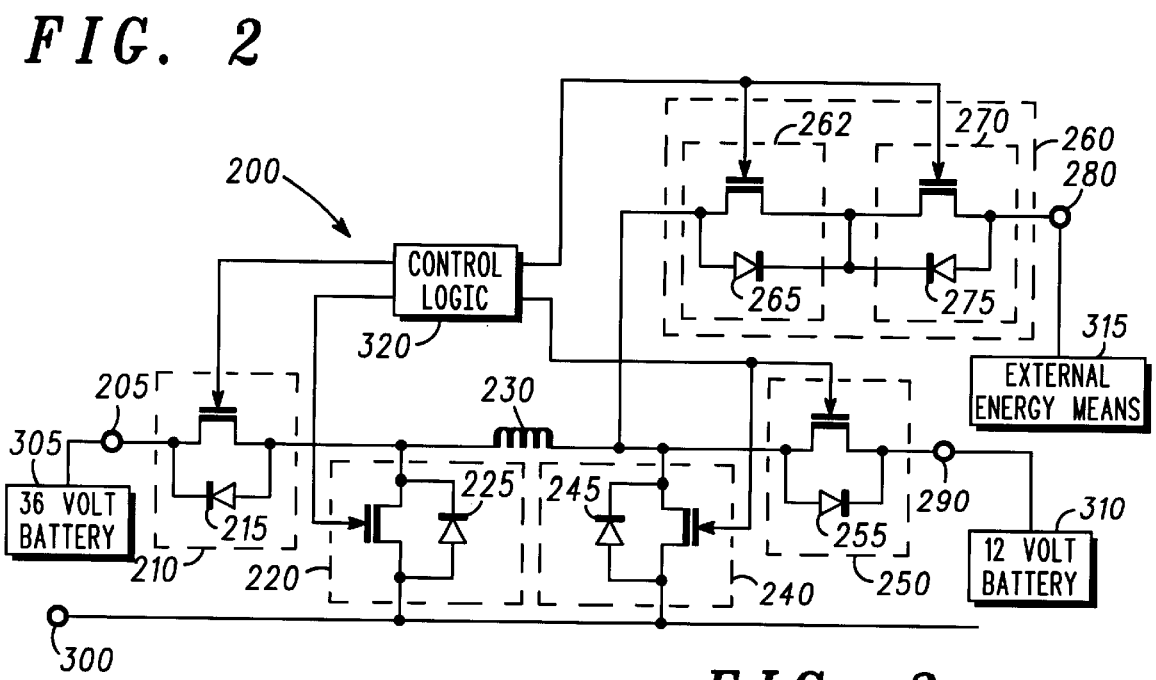
*FIG. 3*

US 6,320,358 B2

BIDIRECTIONAL ENERGY MANAGEMENT SYSTEM INDEPENDENT OF VOLTAGE AND POLARITY

FIELD OF THE INVENTION

This invention relates to energy management systems and particularly but not exclusively to such systems for motor vehicles employing dual voltage electrical schemes.

BACKGROUND OF THE INVENTION

Many motor vehicle electrical systems are now being designed with a dual voltage schemes requiring two batteries having nominal voltages of 14V and 42V (12V and 36V rated batteries respectively) as shown in FIG. 1. The 12V battery 40 typically has a high amp-hour rating and is used to provide energy to 14V loads 50 such as lighting circuits and other circuits which are difficult to implement at higher voltages. The 36V battery 80 typically has a high cranking current capability and is coupled to a 42V generator and higher voltage loads 70, which may include the engine starter motor.

In the event that one or other of these batteries becomes depleted of charge, there is a need to transfer power between them in a bidirectional manner. In order to do this, it is known to provide a conventional bidirectional DC-DC converter 60, coupled between the 12V battery 50 and the 36V battery 80. The bidirectional DC-DC converter 60 acts as a step-down converter (right to left in FIG. 1) or a step-up converter (left to right in FIG. 1) through switching charge through an inductor in a well known manner.

An external 'start aid' post 10 is also provided, to enable an external means of charging the batteries. A switch 30 switches between the start aid post 10 and the 12V battery 40, and a fuse and diode arrangement 20 is coupled between the switch 30 and the start aid post 10. When a positive DC voltage is applied to the start aid post 10, the switch 30 isolates the 12V battery 40 and the DC voltage is coupled through the fuse and diode arrangement 20 to charge the 36V battery 80 via the bidirectional DC-DC converter 60. When the DC voltage is removed from the start aid post 10, the switch 30 isolates the start aid post 10 and re-couples the 12V battery 40 to the bidirectional DC-DC converter 60, whereupon (if necessary) the 12V battery 40 is charged by the 36V battery 80 via the bidirectional DC-DC converter 60.

FIG. 2 shows the internal architecture of the bi-directional DC-DC converter 60, which has a first path 100 coupled to the 36V battery 80 (not shown), a second path 170 coupled to the 12V battery 40 (not shown), first and second switches 130 and 150 respectively and an inductor 140. The first and second switches 130 and 150 respectively are coupled in series between the first path 100 and earth. The inductor 140 is coupled between the second path 170 and a node between the first and second switches 130 and 150 respectively. The switches are switched by control logic in one of two ways: to transfer energy from the first path 100 to the second path 170 (step-down); and to transfer energy from the second path 170 to the first path 100 (step-up). Both of these are achieved by switching charge through the inductor 140.

A problem with this arrangement is that for it to function correctly as a step-up converter, the first path 100 (and hence the 36 battery 80) must be at a higher potential than the second path 170, otherwise the intrinsic body diode 135 of the first switch 130 will conduct. Therefore if the 36V battery 80 is faulty, greatly discharged or replaced by a new battery, and therefore has a voltage less than that of the 12V battery 40 (or the start aid post 10, if appropriate), then the current flow will be uncontrolled, with potentially catastrophic results. It is possible to prevent this current flow by adding another switch in inverse series with the first switch 130, but this would still not enable charging in this state. This problem is compounded by the emergence of vehicles with an exclusively 42V electrical system, because such vehicles cannot be used to provide a jump-start via the start aid post 10.

A further problem is that by adding an additional switch the DC-DC converter 60, the circuit of FIG. 1 would require 7 MOSFETs (metal-oxide semiconductor field-effect transistors), as the changeover switch in the start aid post 10 requires 2 sets of inverse series MOSFETs, in addition to the three required in the DC-DC converter 60.

There is therefore a need for a more flexible arrangement which enables a two-battery vehicle to re-charge either battery from the other, and which also provides improved flexibility for to charge and be charged via a start aid post.

This invention seeks to provide a DC-DC converter and energy management system which mitigate the above mentioned disadvantages.

SUMMARY OF THE INVENTION

According to a first aspect of the present invention there is provided a DC-DC converter for use with an energy management system of a motor vehicle, comprising: first and second voltage supply terminals having first and second nominal voltages respectively, at least one of the first and second voltage supply terminals being arranged for coupling to a battery; and a third voltage supply terminal for exchanging energy with an external energy means; wherein the DC-DC converter is arranged to exchange energy between the first or second voltage supply terminals and the third voltage supply terminal independent of the voltage and polarity of the external energy means.

According to a second aspect of the present invention there is provided an energy management system for a motor vehicle, comprising: first and second voltage supply terminals having first and second nominal voltages respectively; at least one battery coupled to at least one of the first and second voltage supply terminals; a universal bi-directional DC-DC converter coupled between the first and second voltage supply terminals for exchanging energy therebetween; and a third voltage supply terminal for exchanging energy between the DC-DC converter and an external energy means; wherein the energy exchanged between the first or second voltage supply terminals and the third voltage supply terminal is independent of the voltage and polarity of the external energy means.

Preferably the universal bi-directional DC-DC converter comprises five switches, an inductor and control logic arranged such that energy is exchanged via step-up and step-down conversion from the first to the second voltage supply terminal and from the second to the first voltage supply terminal. The switches of the universal bidirectional DC-DC converter are preferably implemented using Metal Oxide Semiconductor Field Effect Transistors, and preferably at least two of the Metal Oxide Semiconductor Field Effect Transistors are implemented as a pair of inverse series transistors.

Preferably the external energy means is an electrical system of another vehicle, such that the energy management system is coupled to exchange energy with the electrical system of the other vehicle. The exchange of energy is preferably the charging of a battery of the electrical system of the other vehicle by the energy management system. Alternatively the exchange of energy is the charging of the at least one battery by the electrical system of the other vehicle.

Alternatively the external energy means is preferably a battery charger coupled to charge the energy management system. Preferably the nominal voltages of the first and second voltage supply terminals are 12 volts and 36 volts respectively.

In this way an energy management system is provided for a two-battery vehicle in which either battery may be re-charged from the other, and in which a start aid post may also be used to charge one or other battery and be charged by one or other battery, irrespective of voltage or polarity. The system is also simply implemented with a minimum number of switches.

BRIEF DESCRIPTION OF THE DRAWINGS

An exemplary embodiment of the invention will now be described with reference to the drawings in which:

FIG. 1 shows a prior art energy management system;

FIG. 2 shows a circuit diagram of the prior art energy management system of FIG. 1; and, FIG. 3 shows a preferred embodiment of an energy management system in accordance with the invention.

DETAILED DESCRIPTION OF A PREFERRED EMBODIMENT

Referring to FIG. 3, there is shown a universal bidirectional DC-DC converter 200 forming part of an energy management system of a motor vehicle electrical system having 36V and 12V circuits. The system 200 comprises an inductor 230 and five switches implemented using MOSFETs: 210 (first), 220 (second), 240 (third) and 250 (fourth) switches use single MOSFETs, and the fifth switch 260 uses an inverse series pair formed by MOSFETs 262 and 270. Each of the MOSFETs have an inherent body diode 215, 225, 245, 255, 265 and 275 respectively.

The first switch 210 has a first conducting electrode coupled to a 36V terminal 205, which is in turn coupled to a 36V battery 305, and a second conducting electrode coupled to a first terminal of the inductor 230. The second switch 220 has a first conducting electrode coupled to the first terminal of the inductor 230, and a second conducting electrode coupled to a ground terminal 300.

The third switch 240 has a first conducting electrode coupled to a second terminal of the inductor 230, and a second conducting electrode coupled to a ground terminal 300. The fourth switch 250 has a first conducting electrode coupled to a 12V terminal 290, which is in turn coupled to a 12V battery 310, and a second conducting electrode coupled to the second terminal of the inductor 230.

The fifth switch 260 is formed by first and second MOSFETs 262 and 270. The first MOSFET 262 has a first conducting electrode coupled to the second terminal of the inductor 230 and a second conducting electrode. The second MOSFET 270 has a first conducting electrode coupled to the second conducting electrode of the first MOSFET 262 and a second conducting electrode coupled to a start aid terminal 280, to which the battery of another vehicle or a battery charger 315 can be connected for the purpose of jumpstarting. In this way MOSFET 262 and MOSFET 270 form the switch 260 for the purpose of switching the start aid terminal 280.

In this way the first, second, third, and fourth switches 210, 220, 240, and 250 respectively, form a universal bi-directional step-up/step-down converter between the 36V battery 305 and the 12V battery 310, and the fifth switch 260 provides a path to start aid post 280, the path being integrated with the DC-DC converter.

Each of switches 210, 220, 240, 250 and the two MOSFETs 262 and 270 have a control electrode coupled to control logic 320. The control logic 320 manages the switching of the switches 210, 220, 240, 250 and 260 in a manner to be further described below.

In operation, the DC-DC converter 200 is arranged to function in a number of modes, in dependence upon the voltages at the 36V terminal 205, the start aid terminal 280 and the 12V terminal 290. The control logic uses these voltages to choose a configuration which satisfies the required transfer of charge, and to select this configuration by setting the switches 210, 220, 240, 250 and 260 accordingly. The configurations and their respective switch settings are as follows:

a) Step-down from 36V battery terminal 205 to 12V battery terminal 290: The first and second switches 210 and 220 respectively are switched in antiphase, the third and fifth switches 240 and 260 respectively are held in a non-conductive state and the fourth switch 250 is held in a conductive state. It should be noted that only the first switch 210 need be switched, because of the body diodes. However switching the second switch 220 increases the efficiency using a well known technique of active rectification. This basic approach is true for all the states below, the following configurations will assume that active rectification is always used.

b) Step-down from 12V battery terminal 290 to 36V battery terminal 205 (when the 36V battery is depleted to a terminal voltage of less than 12V): The third and fourth switches 240 and 250 respectively are switched in antiphase, the first switch 210 is held in a conductive state and the remaining switches are held in a non-conductive state.

c) Step-up from 12V battery terminal 290 to 36V battery terminal 205: The first and second switches 210 and 220 respectively are switched in antiphase, the fourth switch 250 is held in a conductive state and the remaining switches are held in a non-conductive state.

d) Step-up from start aid terminal 280 to 36V battery terminal 205: The first and second switches 210 and 220 respectively are switched in antiphase, the fifth switch 260 is held in a conductive state, and the remaining switches are held in a non-conductive state.

e) Step-down from start aid terminal 280 to 36V battery terminal 205 (when the 36V battery has a terminal voltage of less than that of the start aid terminal 280): The third and fifth switches 240 and 260 respectively are switched in antiphase, the first switch 210 is held in a conductive state, and the remaining switches are held in a non-conductive state.

f) Invert (step up or down) from start aid terminal 280 to 12V battery terminal 290: The fourth and fifth switches 250 and 260 respectively are switched in antiphase, the second switch 220 is held in a conductive state and the remaining switches are held in a non-conductive state.

g) Step down from 36V battery terminal 205 to start aid terminal 280: The first and second switches 210 and 220 respectively are switched in antiphase, the fifth switch 260 is held in a conductive state and the remaining switches are held in a non-conductive state.

h) Step up from 36V battery terminal 205 to start aid terminal 280: The third and fifth switches 240 and 260 respectively are switched in antiphase, the first switch 210 is held in a conductive state and the remaining switches are held in a non-conductive state.

i) Invert from 12V battery terminal 290 to start aid terminal 280: The fourth and fifth switches 250 and 260 respectively are switched in antiphase, the second switch 220 is held in a conductive state and the remaining switches are held in a non-conductive state. It will be evident that this is the same configuration as f) above but with the energy flow in the other direction.

In this way the start aid terminal 280 can accept any positive voltage and provide energy to the 36V terminal 205, and can accept a negative voltage and use an inverting configuration to provide energy to the 12V terminal 290. Once either the 12V or 36V battery is charged this can be used to charge the other battery without use of the start aid terminal 280. It will also be seen that the start aid terminal 280 can be used as a source of power of any (reasonable) voltage and polarity (for example to jump start another vehicle or to provide power to an electrical accessory). It is possible that the start aid terminal 280 could be coupled to an internal electrical socket such as a conventional cigarette lighter socket, and could thus be used to provide DC voltage to accessories plugged into the socket. As all of the switches are present active rectification is possible in all configurations, providing high efficiency.

It will be appreciated that that some configurations may be used simultaneously. For example operations a) and g) can occur simultaneously by also switching the fourth and sixth switches 250 and 260 respectfully (thus giving energy to both the 12V battery terminal 290 and to the start aid terminal 280 simultaneously, which is not possible in the prior art arrangement of FIG. 1).

As can be seen from FIG. 3, six MOSFETs (or equivalent switches) are used to implement both the universal DC-DC converter and the start aid terminal 280 switching. This implementation provides for operation in any battery state and for jump starting from any reasonable voltage, with one less switch (seven switches are required in the prior art arrangement of FIGS. 1 and 2). Furthermore by providing further MOSFETs in inverse series with the MOSFETs forming the third and fourth switches 240 and 250 respectively (thus making the switch arrangement of the 12V terminal 290 similar to that of the start aid terminal 280), reverse 12V battery protection is also achieved.

Therefore vehicles having electrical systems employing widely differing voltages, such as motorcycles (6V), conventional vehicles (12V), trucks (24V) and new vehicles (42V), are able to provide a jump-start to the motor vehicle, and are able to receive a jump-start from the motor vehicle, via the start aid terminal 280.

It will be appreciated that alternative embodiments to the one described above are possible. For example, the voltages of the motor vehicle electrical system may differ from those described above in terms of nominal voltage values and number of batteries. For example, rather than the two batteries described above, it is possible to use a single battery (for example a 36V battery) for one voltage terminal and a capacitor bank or similar charge storage arrangement for the other voltage terminal.

Furthermore the implementation may differ from that described above. An alternative to the MOSFET technology described above, such as Insulation Gate Bipolar Transistors (IGBTs) could be utilised.

What is claimed is:

1. A DC-DC converter for use with an energy management system of a motor vehicle, comprising:

first and second voltage supply terminals having first and second nominal voltages respectively, at least one of the first and second voltage supply terminals being arranged for coupling to a battery; and a third voltage supply terminal for exchanging energy with an external energy means;

wherein the DC-DC converter is arranged to exchange energy between the first or second voltage supply terminals and the third voltage supply terminal independent of the voltage and polarity of the external energy means.

2. The DC-DC converter of claim 1 further comprising five switches, an inductor and control logic arranged such that energy is exchanged via step-up and step-down conversion from the first to the second voltage supply terminal and from the second to the first voltage supply terminal.

3. The DC-DC converter of claim 2 wherein the switches are implemented using Metal Oxide Semiconductor Field Effect Transistors.

4. The DC-DC converter of claim 3 wherein at least two of the Metal Oxide Semiconductor Field Effect Transistors are implemented as a pair of inverse series transistors.

5. The DC-DC converter of claim 1 wherein the external energy means is an electrical system of another vehicle, such that the energy management system is coupled to exchange energy with the electrical system of the other vehicle.

6. The DC-DC converter of claim 5 wherein the exchange of energy is the charging of a battery of the electrical system of the other vehicle by the energy management system.

7. The DC-DC converter of claim 5 wherein the exchange of energy is the charging of a battery of the motor vehicle by the electrical system of the other vehicle.

8. The DC-DC converter of claim 1 wherein the external energy means is a battery charger coupled to charge the energy management system.

9. The DC-DC converter of claim 1 wherein the external energy means is an accessory coupled to the third voltage terminal via a cigarette lighter socket of the vehicle.

10. The DC-DC converter or system of claim 1 wherein the nominal voltages of the first and second voltage supply terminals are 36 volts and 12 volts respectively.

11. An energy management system for a motor vehicle, comprising:

first and second voltage supply terminals having first and second nominal voltages respectively;

at least one battery coupled to at least one of the first and second voltage supply terminals;

a universal bidirectional DC-DC converter coupled between the first and second voltage supply terminals for exchanging energy therebetween; and a third voltage supply terminal for exchanging energy between the DC-DC converter and an external energy means;

wherein the energy exchanged between the first or second voltage supply terminals and the third voltage supply terminal is independent of the voltage and polarity of the external energy means.

12. The system of claim 11 wherein the universal bi-directional DC-DC converter comprises five switches, an inductor and control logic arranged such that energy is exchanged via step-up and step-down conversion from the first to the second voltage supply terminal and from the second to the first voltage supply terminal.

13. The system of claim 11 wherein the switches of the universal bi-directional DC-DC converter are implemented using Metal Oxide Semiconductor Field Effect Transistors.

14. The system of claim 13 wherein at least two of the Metal Oxide Semiconductor Field Effect Transistors are implemented as a pair of inverse series transistors.

15. The system of claim 11 wherein the external energy means is an electrical system of another vehicle, such that the energy management system is coupled to exchange energy with the electrical system of the other vehicle.

16. The system of claim 15 wherein the exchange of energy is the charging of a battery of the electrical system of the other vehicle by the energy management system.

17. The system of claim 15 wherein the exchange of energy is the charging of the at least one battery by the electrical system of the other vehicle.

18. The system of claim 11 wherein the external energy means is a battery charger coupled to charge the energy management system.

19. The system of claim 11 wherein the external energy means is an accessory coupled to the third voltage terminal via a cigarette lighter socket of the vehicle.

20. The system of claim 11 wherein the nominal voltages of the first and second voltage supply terminals are 36 volts and 12 volts respectively.

* * * * *